I. J. Sloan,

Making Wood Screws,

No. 110, Reissued Mar. 8, 1848.

UNITED STATES PATENT OFFICE.

THOMAS J. SLOAN, OF NEW YORK, N. Y.

IMPROVEMENT IN MACHINERY FOR CUTTING THE THREADS OF POINTED SCREWS.

Specification forming part of Letters Patent No. 4,864, dated November 24, 1846; Reissue No. 110, dated March 8, 1848.

*To all whom it may concern:*

Be it known that I, THOMAS J. SLOAN, of the city, county, and State of New York, have invented new and useful Improvements in the Machine for Threading Screws; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
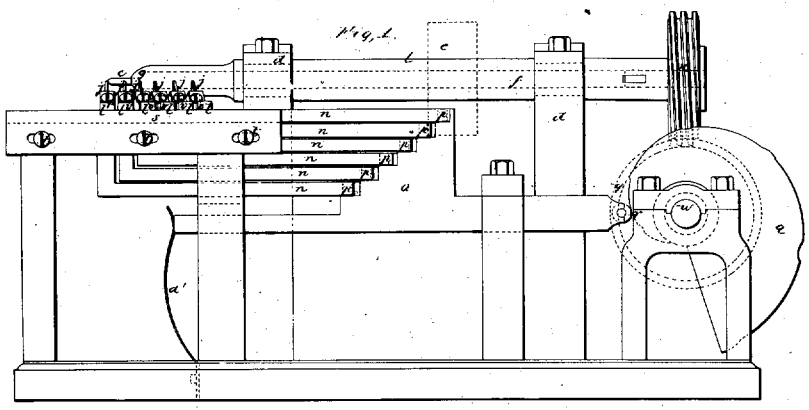
Figure 5:
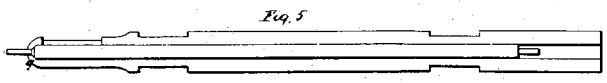
Figure 2:
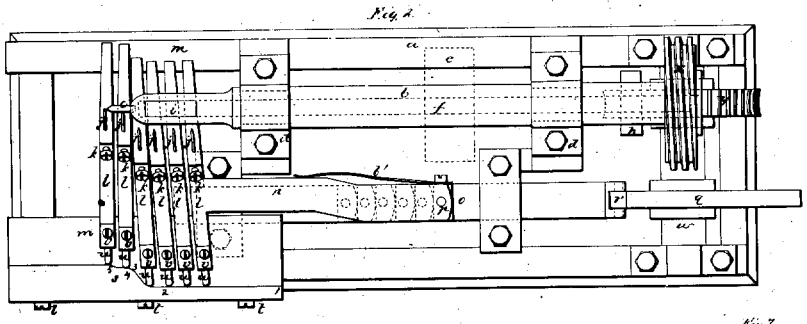
Figure 3:
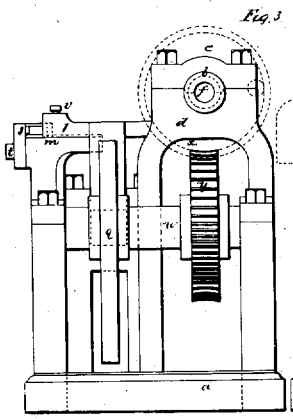
Figure 4:
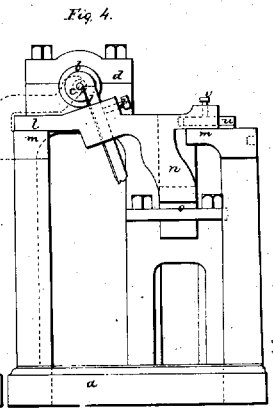
Figure 6:
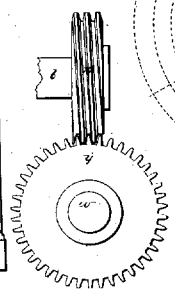
Figure 7:
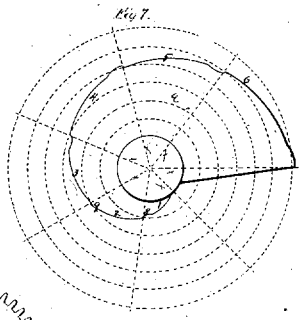

Figure 1 is an elevation; Fig. 2, a plan; Fig. 3, an elevation of the right-hand end; Fig. 4, an elevation of the left-hand end; Fig. 5, a longitudinal section through the mandrel which holds the blank; Fig. 6, a view of the gearing, and Fig. 7 a separate view of the threading-cam.

The same letters indicate like parts in all the figures.

The object of my invention is to cut the threads of that kind of wood-screws invented by me, in which the point is made conical, with the turns of the thread at equal distances apart along the body and point and gradually reduced in depth and width along the conical part and toward the apex thereof. As in this kind of screws the line of the thread has the same pitch at the conical point as it has along the body, and the thread is gradually reduced in depth and thickness toward the apex of the conical part, it becomes necessary to have the motions which give the pitch to the thread varied as the cutters come to and from the thread on the conical part, so that the cutting-edges which form the under and upper faces of the thread on the conical part may gradually approach the pitch-line of the thread and coincide with it at the apex of the cone, and thus form the thread with all the turns at equal distances apart and gradually reduced in depth toward the apex of the conical point.

The nature of this part of my invention therefore consists, first, in giving such motions to the cutting-edges which form the upper and under faces of the thread along the conical part relatively to the motion of the blank that they shall approach the line of the spiral that forms a thread the turns of which are at equal distances apart.

In the accompanying drawings, *a* represents a frame properly adapted to the purpose, but which may be varied at pleasure, and *b* a spindle or mandrel that carries the screw-blank *c* to be threaded. This spindle runs in appropriate boxes in the two standards *d d* of the frame, and may be driven by a belt from any first mover passing around a pulley, *e*, (shown by dotted lines,) or in any other desired manner. It is made hollow from end to end to receive a rod, *f*, that holds the screw-blank against the inner shoulder, *g*, of the forward end of the spindle, the hole being there contracted to the size of the shank of the screw, that it may be gripped between this shoulder and the end of the rod *f* by a wedge-key, *h*, that passes through a hole in the spindle and rod. The screw-blank is introduced through a mortise, *i*, in the head of the spindle and the shank pushed through the central hole by the rod *f* until the under side of the head is brought against the shoulder *g*, where it is gripped, the rod being provided with a fillet or screw-driver to fit into the nick in the head of the blank.

The chasing-tools or cutters *j j* are inserted and fastened by temper-screws *k* each in a sliding head, *l*, by means of which the chasers can be made to move toward the axis of the blank to cut in and to move from end to end to determine the pitch of the thread. The rear and front ends of the sliding heads rest on ways *m m* of the frame, that they may slide freely in any horizontal direction, and each head is provided with an arm, *n*, so formed that they all lie one above another, although the heads are all on the same plane. The said arms are jointed to a slide, *o*, each on a separate pin, *p*, that they may vibrate thereon freely, so that when the slide *o* moves it carries with it all the heads with the chasers in them to determine the pitch of the thread. The pitch of the thread is determined by a cam, *q*, the periphery of which acts on the slide *o* (a roller, *r*, being interposed to avoid friction) to move the chasers in the direction from the head toward the point of the blank. The chasers, as they move from end to end of the blank, are pushed toward the axis of the blank to cut the thread by the curved face of a mold, *s*, attached to one of the ways, *m*, by means of screws *t t t*, that pass through elongated holes to admit of adjustment. The rear end of the chaser-heads are provided each with an adjustable piece, *u*, secured in place by a set-screw, *v*, that the point of each chaser may be adjusted that each may cut deeper than the preceding, and to adapt the machine to the cutting of screws of different sizes, and these adjustable pieces are rounded off or otherwise adapted to slide against the face of the mold *s*, which is so formed that from the point 1 to 2 it is straight, that the chaser may gradually approach the point where they are to be moved toward the axis of the blank. From 2 to 3 the mold is curved, to push each chaser in turn toward the blank to commence the thread. From 3 to 4 it runs parallel with the axis of the blank, or slightly inclined thereto, to chase the thread along the body of the stem; and from 4 to 5 it again curves in, to make the chasers one by one approach the axis of the blank to form the conical point of the screw, and as it is desirable that the conical point should gradually run into the line of the body this part of the mold is made with a gentle curve. In this way the whole series of chasers are made to act on the blank in succession to cut the thread, each in succession cutting deeper, so that the thread is completed by one motion of the series.

The motion of the chasers to determine the pitch of the thread is communicated to the chaser, as stated above, by the cam *q* on the shaft *w*, which receives motion from the spindle or mandrel *b* by a worm, *x*, and cog-wheel *y*.

The cam *q* is divided into six parts—one for each chaser. The first part, 1, operates the slide *o* to carry the chaser along the body of the blank by a regular motion, to give the pitch to the thread, and as it passes along the conical point this progressive motion is slightly retarded by the depression 8 in the face of the cam. The second division, 2, then begins to act on the slide to carry the second chaser along the body of the blank, and at the end of this division there is a slight swell, *g*, from the general line of the cam, to accelerate the motion of the chaser in forming the thread along the conical point of the screw. In like manner each division of the cam from 1 to 6 has either a depression or a swell alternating, so that one chaser is accelerated, the next retarded, and so on to the end, to cut away the upper and under surfaces of the thread on the conical part or point, and thus gradually reduce the depth of the thread, and at the same time form the pitch-line of all the turns of the thread at equal distances apart. So soon as the last division of the cam passes the roller *r* the slide *o* is pushed back by a spring, *a'*, to recommence the operation on another blank, which must be substituted for the one that has been threaded. On the return motion of the slide the chasers are pushed back from the blank by springs *b'*, attached to the slide and bearing against the arm of each head. Only one of these springs is shown in the drawings, the others being applied in the same way.

The above represents one of the modes in which the principle of my invention can be applied; but it will be apparent on examination that this principle is susceptible of a variety of modifications—as, for instance, the desired form can be given to the thread with one chaser or cutter only by giving to it, as it reaches the conical point, alternately an accelerated and then a retarded motion, that at one cut it may move faster as it passes along the conical point, and at the next slower, and so on until the thread is completed. By thus accelerating and retarding the motion the two faces of the chaser gradually approach the pitch-line of the thread toward the apex of the conical point, and thus reduce the depth of the thread, and finally lose it in the apex of the conical core; or two chasers may be employed, one having an accelerated and the other a retarded motion when passing along the conical point, the spindle having a regular motion; or the two chasers may remain stationary while cutting the thread on the cylindrical part or body of the stem, the blank being moved longitudinally to give the pitch to the thread, and then, as the conical part or point passes the chasers, the cutters or chasers are caused gradually to move in opposite directions toward the pitch-line of the thread; or a single fixed chaser may be used by giving a longitudinal motion to the blank for determining the pitch of the thread, and alternately accelerating and retarding this motion to form the thread on the conical part, as above described.

The form of cam described above for giving the alternate accelerated and retarded motions to the chasers, together with the mode of gripping the blank and operating the chaser-heads, may be variously modified without changing the principle of my invention, these being simply described and represented to show one of the modes of applying the said principle.

What I claim as my invention, and desire to secure by Letters Patent, is—

Giving to the cutting-edges which form the upper and under surfaces of the thread on the conical part of the screw a motion or motions or position relatively to the motion of the blank on which the thread is to be cut, so that they shall gradually approach the pitch-line of the thread, the turns of which are at equal distances apart, and thereby gradually reduce the depth of the thread as it approaches the apex of the cone, substantially as described.

THOS. J. SLOAN.

Witnesses:
ALXER. PORTER BROWNE,
CHS. M. KELLER.